US009086854B2

(12) United States Patent
Liao et al.

(10) Patent No.: US 9,086,854 B2
(45) Date of Patent: Jul. 21, 2015

(54) HINGE ASSEMBLY AND ELECTRONIC DEVICE USING THE SAME

(71) Applicant: Acer Incorporated, New Taipei (TW)

(72) Inventors: Wen-Neng Liao, New Taipei (TW); Ting-Chiang Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 224 days.

(21) Appl. No.: 13/721,030

(22) Filed: Dec. 20, 2012

(65) Prior Publication Data

US 2014/0130303 A1  May 15, 2014

(30) Foreign Application Priority Data

Nov. 15, 2012 (TW) .............................. 101142676 A

(51) Int. Cl.
*G06F 1/16* (2006.01)

(52) U.S. Cl.
CPC ............ *G06F 1/1681* (2013.01); *G06F 1/1679* (2013.01); *Y10T 16/54* (2015.01)

(58) Field of Classification Search
USPC .......... 455/566, 556.1, 572, 557, 552.1, 90.2, 455/575.1, 401.1, 41.1; 361/679.31, 361/679.27, 679.01, 679.09, 679.4, 679.21, 361/679.29, 679.55, 679.56, 679.43; 16/221, 264, 57, 303, 354; 312/223.1, 312/228, 319.5, 196; 345/173, 179, 174, 345/168, 169, 156, 171
See application file for complete search history.

(56) References Cited

U.S. PATENT DOCUMENTS

| | | | |
|---|---|---|---|
| 8,520,377 B2* | 8/2013 | Senatori | 361/679.27 |
| 2003/0154571 A1 | 8/2003 | Hsiang et al. | |
| 2012/0044155 A1 | 2/2012 | Nakada | |
| 2014/0049894 A1* | 2/2014 | Rihn et al. | 361/679.27 |
| 2014/0153179 A1* | 6/2014 | Fourie | 361/679.31 |
| 2014/0157546 A1* | 6/2014 | Ho et al. | 16/221 |

FOREIGN PATENT DOCUMENTS

WO    2008067663    6/2008

* cited by examiner

*Primary Examiner* — Hung Duong
(74) *Attorney, Agent, or Firm* — Jianq Chyun IP Office

(57) ABSTRACT

A hinge assembly used for connecting between an arm and a display of an electronic device is provided. The display has a back surface. The hinge assembly includes a first hinge and a second hinge. The first hinge is pivoted between the display and the arm, such that the display is rotated relative to the arm. The second hinge is assembled to the first hinge. The second hinge has at least one positioning surface leaning against the back surface of the display. An electronic device using the hinge assembly is also provided.

10 Claims, 5 Drawing Sheets

HINGE ASSEMBLY AND ELECTRONIC DEVICE USING THE SAME

CROSS-REFERENCE TO RELATED APPLICATION

This application claims the priority benefit of Taiwan application serial no. 101142676, filed on Nov. 15, 2012. The entirety of the above-mentioned patent application is hereby incorporated by reference herein and made a part of this specification.

BACKGROUND

1. Field of the Invention

The present invention is directed to a hinge assembly and more particularly, to a hinge assembly of an electronic device.

2. Description of Related Art

Portable computing devices, such as handheld computers, portable computers, notebook computers, tablet PCs and personal digital assistants (PDAs), have become more and more widespread. Generally, a portable computing device utilizes a display assembly formed by a base unit and a display configuration of the base unit for a user to operate and view. Especially, with the increasing development of the touch display technology, a touch display has become basic equipment for a portable computer.

Taking a notebook computer for example, a hinge is used as a mechanism enabling two machine bodies to move relative to each other. However, once a touch display is equipped, the hinge is also required to be sufficient for supporting the force which the user applies on the touch display while the machine bodies are expanded relative to each other. Nevertheless, it is difficult for the hinge to take care of both the force of operating the touch display and the force of expanding the machine bodies. As a result, even though the user can easily expand the machine bodies, the machine will be wobbling while operating the touch display, which leads to difficulty of operation.

SUMMARY

The present invention is directed to a hinge assembly and an electronic device using the same, which provides a stable operation interface for a user.

According to an embodiment of the present invention, a hinge assembly used for connecting between an arm and a display of an electronic device is provided, wherein the display has a back surface. The hinge assembly includes a first hinge and a second hinge. The first hinge is pivoted between the display and the arm, such that the display is rotated relative to the arm. The second hinge is assembled to the first hinge. The second hinge has at least one positioning surface leaning against the back surface of the display.

According to another embodiment of the present invention, an electronic device including a first body, an arm and a hinge assembly is provided. The first body has a back surface. The hinge assembly includes a first hinge and a second hinge. The first hinge is pivoted between the first body and the arm, such that the first body is rotated relative to the arm. The second hinge is assembled to the first hinge. The second hinge has at least one positioning surface leaning against the back surface of the first body.

To sum up, in the embodiments of the present invention, with the second hinge assembled to the first hinge, the positioning surfaces of the second hinge and the back surface of the display lean against each other while the display is rotated relative to the arm by the first hinge so as to achieve surface contact between the display and the arm and provide effective support for the display.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1:
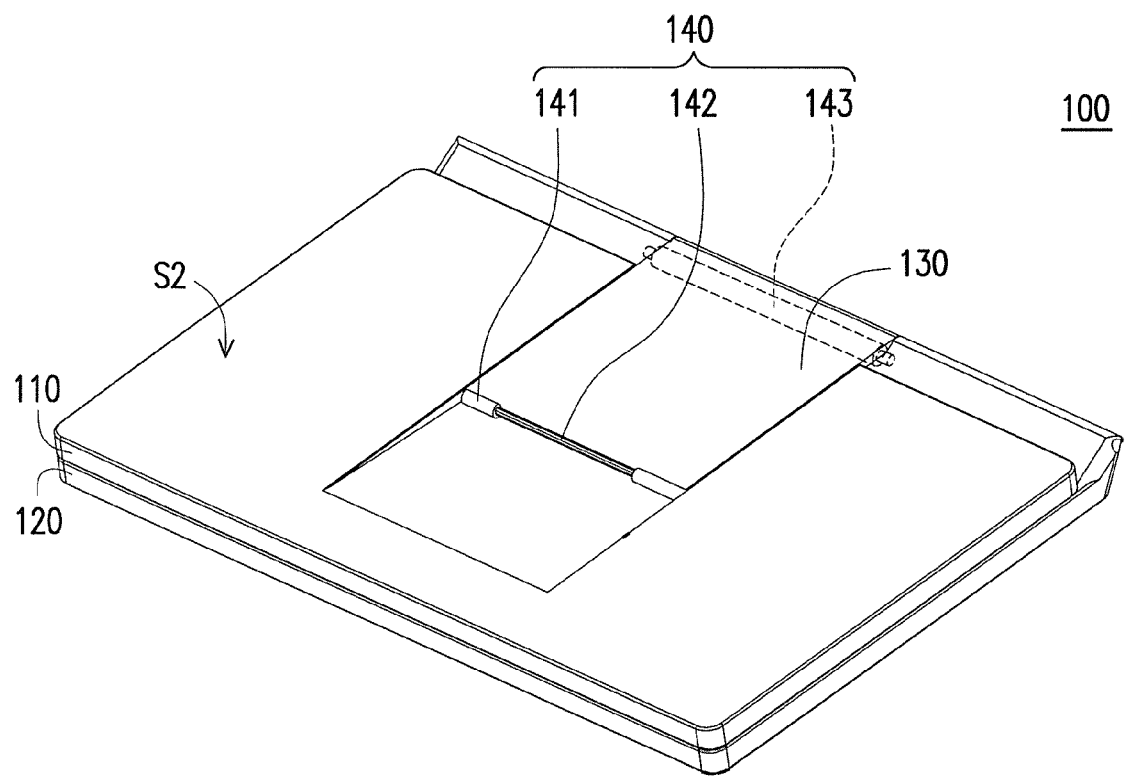
FIG. 1 is a schematic diagram illustrating an electronic device according to an embodiment of the present invention.
Figure 2:
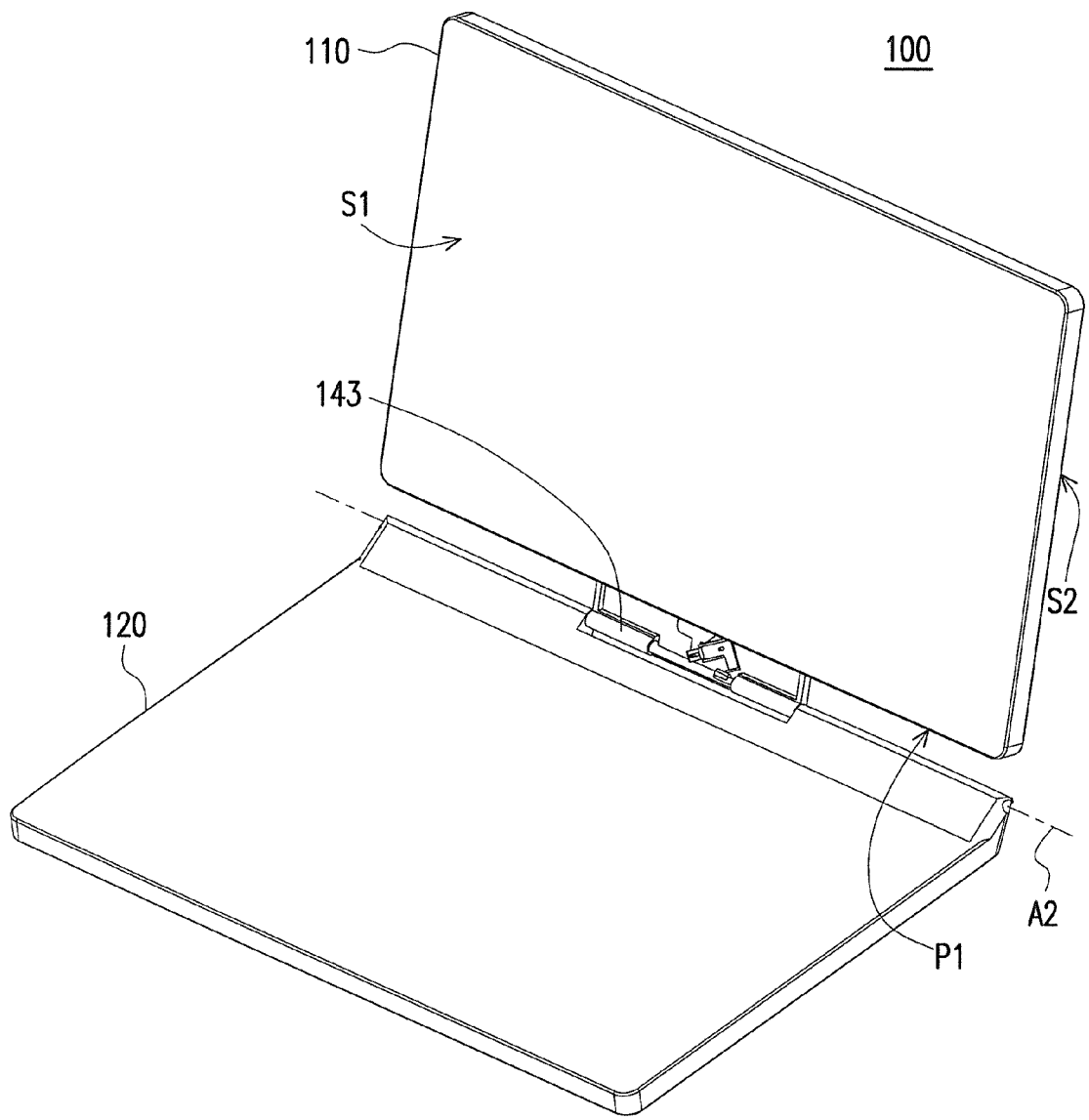
FIG. 2 and FIG. 3 are schematic diagrams illustrating the electronic device depicted in FIG. 1 in different states.
Figure 3:
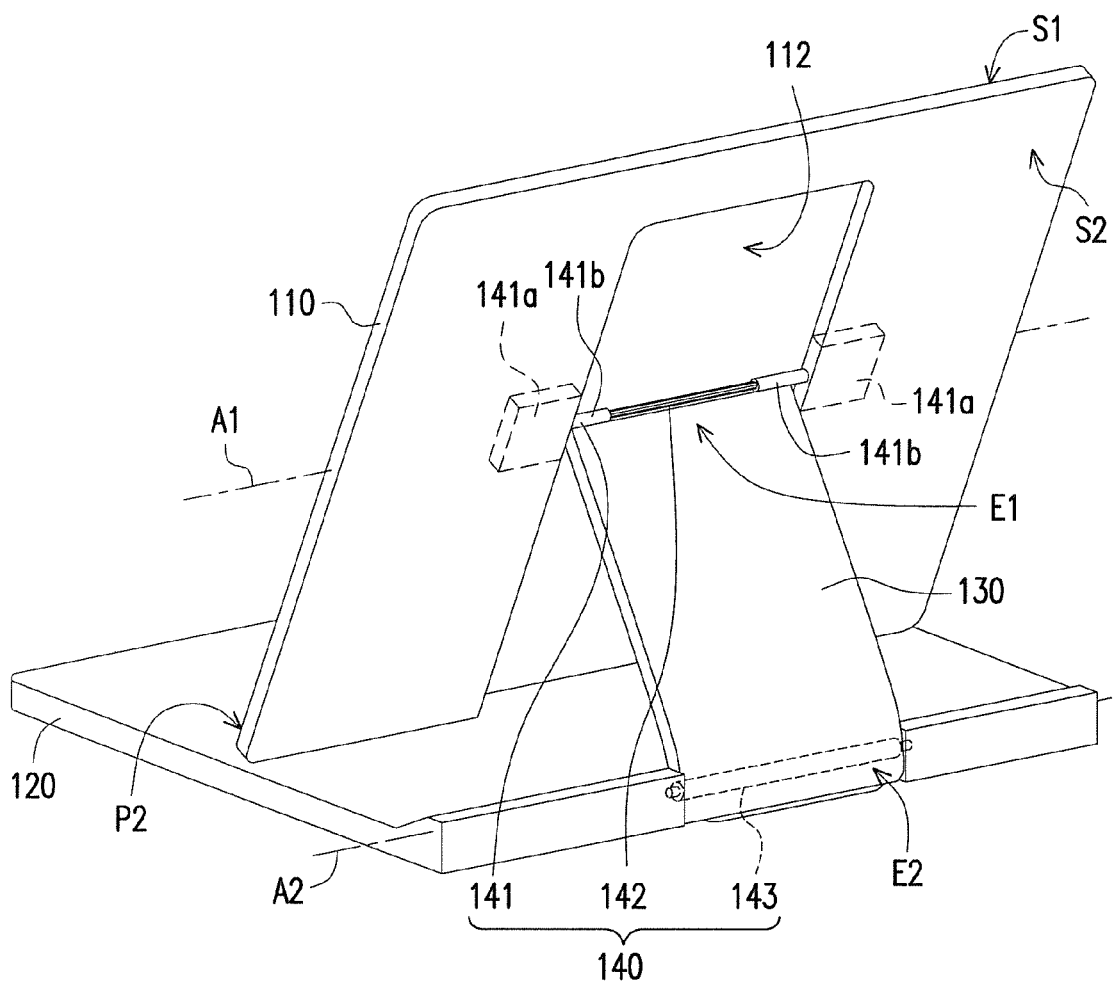

FIG. 1 is a schematic diagram illustrating an electronic device according to an embodiment of the present invention. FIG. 2 and FIG. 3 are schematic diagrams illustrating the electronic device depicted in FIG. 1 in different states. Referring to FIG. 1 through FIG. 3, in the present embodiment, an electronic device 100 is, for example, a notebook computer and has a first body 110, a second body 120, an arm 130 and a hinge assembly 140. The first body 110 is, for example, a display of the notebook computer and more particularly, a touch display, which has a touch surface S1 and a back surface S2 opposite to each other. Thus, a user may perform an input operation through the touch surface S1.

The second body 120 is, for example, a host of the notebook computer. The arm 130 is connected between the back surface S2 of the first body 110 and the second body 120. Moreover, the hinge assembly 140 is disposed on the arm 130, such that the arm 130 is respectively connected with the first body 110 and the second body 120 through the hinge assembly 140, so that as shown in FIG. 1 through FIG. 3, the electronic device 100 is transferred from a closed state shown in FIG. 1 to an expanded state shown in FIG. 2 or FIG. 3 by the arm 130. Moreover, the first body 110 is moved from a first position P1 shown in FIG. 2 to a second position P2 shown in FIG. 3 by the arm 130, such that the electronic device 100 can provide the user with a more friendly and comfortable viewing angle. Additionally, the user may also adjust the first body 110 to stop at any place between the first position P1 and the second position P2 to select an adaptive viewing angle.

In the present embodiment, the first body 110 has a recess 112 located on the back surface S2, and a first end E1 of the arm 130 is pivoted to the recess 112. Furthermore, the hinge assembly 140 includes a first hinge 141, a second hinge 142 and a third hinge 143. The third hinge 143 is connected between a second end E2 of the arm 130 and the second body 120, such that the arm 130 is rotated relative to the second body 120 about a second axis A2 by the third hinge 143. The first hinge 141 has a pair of base portions 141a disposed at two opposite sides of the recess 112, and axis portions 141b of the first hinge 141 are pivoted between the first end E1 of the arm 130 and the base portions 141a. Accordingly, the first body 110 may be rotated relative to the arm 130 about a first axis A1 by the first hinge 141. In the present embodiment, the first axis A1 is parallel to the second axis A2.

Figure 4:
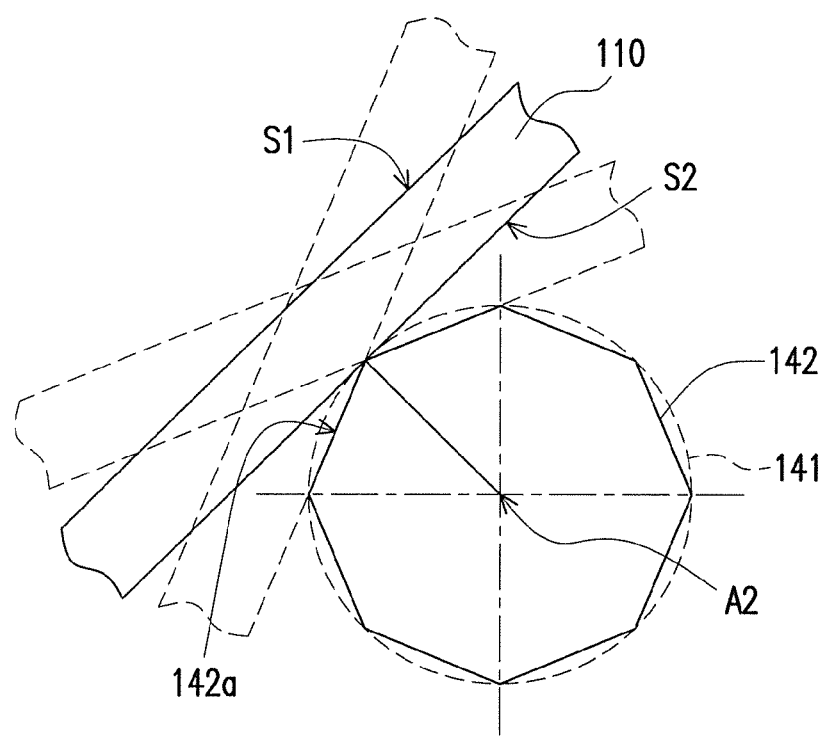
FIG. 4 is a partial equivalent schematic diagram illustrating the electronic device depicted in FIG. 3 located on the second hinge.

It is to be noticed that the second hinge 142 is assembled between the pair of the axis portions 141b of the first hinge 141 without rotating with the axis portions 141b. FIG. 4 is a partial equivalent schematic diagram illustrating the electronic device depicted in FIG. 3 located on the second hinge. Referring to FIG. 4 with FIG. 3, in the present embodiment, the second hinge 142 is coaxial with the first hinge 141 (i.e. by using the first axis A1 as the axis for each other) and has at least one positioning surface 142a. When the first body 110 is rotated relative to the arm 130 about the second axis A2, the positioning surface 142a leans against the back surface S2 of the first body 110 so as to provide support for the first body 110.

In other words, in the present invention, the first body 110 surface-contracts the second hinge 142 by the positioning surface 142a of the second hinge 142 so as to increase the support force of the arm 130 on the first body 110 when the first body 110 receives force (i.e. when the user presses on the touch surface S1). As such, a torque caused by aforementioned pressure on the arm 130 may be abated so as to prevent the first body 110 from wobbling.

In the present embodiment, one of the second hinge 142 and the back surface S2 of the first body 110 has magnetism, while the other one of the second hinge 142 and the back surface S2 of the first body 110 has magnetic permeability, so that the back surface S2 of the first body 110 and the positioning surface 142a of the second hinge 142 are stably combined with each other. In addition, the second hinge 142 and the back surface S2 of the first body 110 have magnetic coupling capable of attracting each other that may also result in a stable combination of the second hinge 142 and the back surface S2 of the first body 110.

As illustrated in FIG. 4, dashed outlines represent that the first body 110 is in different positions and states. In the present embodiment, the second hinge 142 has a plurality of positioning surfaces 142a, and in the second hinge 142 of the present embodiment, any two adjacent positioning surfaces 142a are not parallel to each other. Namely, an angle between the two adjacent positioning surfaces 142a is neither 0 degree nor 180 degrees, and thus, a cross-section of the second hinge 142 of the present embodiment is polygonal. Accordingly, when the first body 110 is rotated relative to the arm 130 (depicted in FIG. 3), the first body 110 is capable of being positioned on one of the positioning surfaces 142a, and the user may further adaptively adjust the viewing angle.

Figure 5:
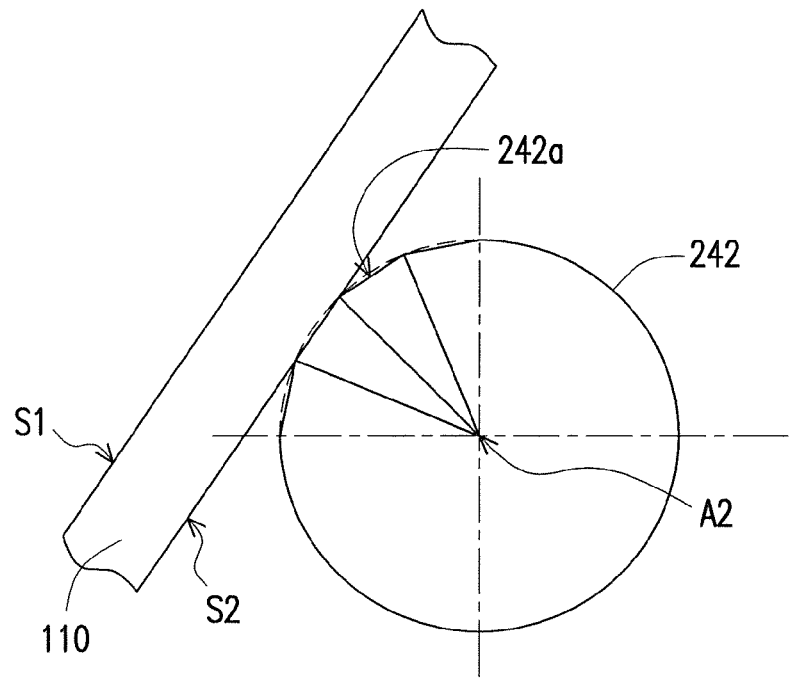
FIG. 5 is a partial equivalent schematic diagram illustrating an electronic device located on the second hinge according to another embodiment of the present invention.

Herein, the disposition type of the positioning surfaces on the second hinge is not limited. FIG. 5 is a partial equivalent schematic diagram illustrating an electronic device located on the second hinge according to another embodiment of the present invention. With reference to FIG. 5, the difference between the present embodiment and the above embodiments lies in that positioning surfaces 242a are only disposed at the second quadrant place of a second hinge 242, and the positioning surfaces 242a divide the second quadrant to four equal parts in a cross-section of the second hinge 242, i.e. each positioning surface 242a has the same area.

Figure 6:
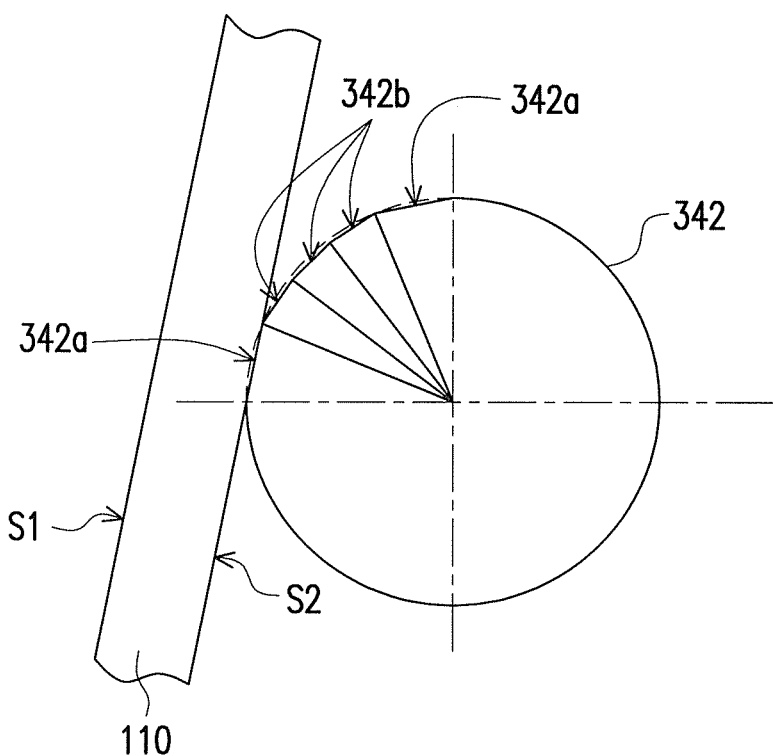
FIG. 6 is a partial equivalent schematic diagram illustrating an electronic device located on the second hinge according to yet another embodiment of the present invention.
Figure 7:
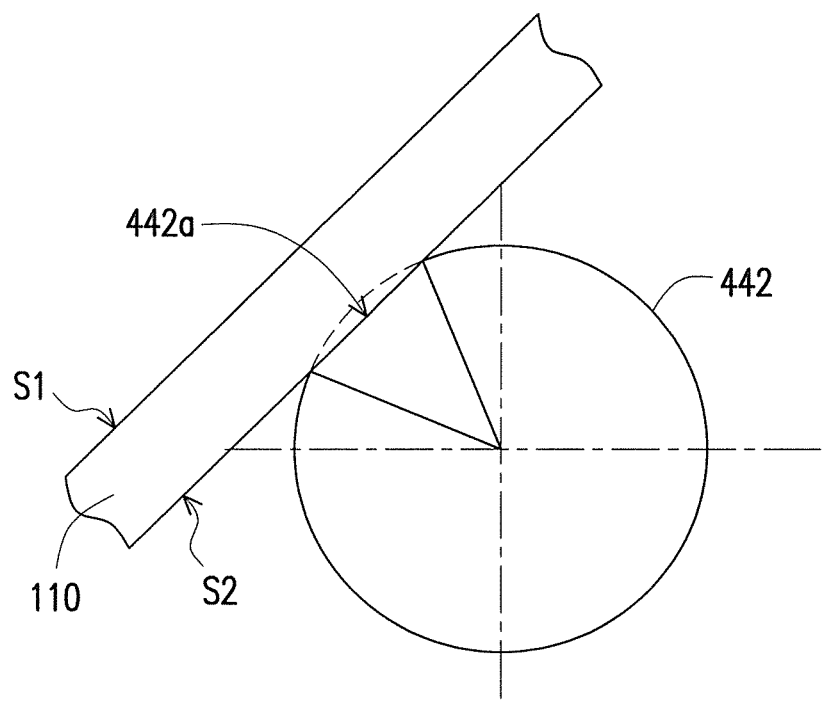
FIG. 7 is a partial equivalent schematic diagram illustrating an electronic device located on the second hinge according to still another embodiment of the present invention.

FIG. 6 is a partial equivalent schematic diagram illustrating an electronic device located on the second hinge according to yet another embodiment of the present invention. With reference to FIG. 6, the difference between the present embodiment and the above embodiments lies in that a second hinge 342 has two positioning surfaces 342a and three positioning surfaces 342b, wherein the positioning surfaces 342b are located between the two positioning surfaces 342a, and the two positioning surfaces 342a have the same area while the positioning surfaces 342b have the same area. However, the area of each positioning surface 342a is not equal to the area of each positioning surface 342b. Further. FIG. 7 is a partial equivalent schematic diagram illustrating an electronic device located on the second hinge according to still another embodiment of the present invention. With reference to FIG. 7, a second hinge 442 merely has one positioning surface 442a so as to be rapidly positioned on the positioning surface 442a when the first body 110 is rotated. In light of the forgoing, a designer may design the positioning surface(s) of the second hinge according to the usage environment and conditions of the electronic device, such that the first body has an adaptive viewing angle for the user.

Based on the above, in the embodiments of the present invention, with the second hinge assembled to the first hinge, with the second hinge assembled to the first hinge, the positioning surfaces of the second hinge and the back surface of the display lean against each other while the display is rotated relative to the arm by the first hinge so as to achieve surface contact between the display and the arm and provide effective support for the display, and therefore, the situation that the first body is wobbling when the user operates it can be avoided.

In addition, the designed can configure the positioning surfaces in different ways according to the usage environment and conditions, such that the view angle of the first body can varied with the user's preferences and the electronic device can have a more friendly operation interface.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A hinge assembly, used for connecting between an arm and a display of an electronic device, wherein the display has a back surface, the hinge assembly comprising:
    a first hinge, pivoted between the display and the arm so as to enable the display to rotate relative to the arm; and
    a second hinge, assembled to the first hinge and comprising at least one positioning surface leaning against the back surface of the display.

2. The hinge assembly according to claim 1, wherein one of the second hinge and the back surface of the display has magnetism, and the other one of the second hinge and the back surface of the display has magnetic permeability.

3. The hinge assembly according to claim 1, wherein a cross-section of the second hinge is polygonal and has a plurality of positioning surfaces having different areas, any two adjacent positioning surfaces are not parallel to each other, and when the display is rotated relative to the arm, the display is positioned on one of the positioning surfaces.

4. The hinge assembly according to claim 1, wherein the first hinge and the second hinge are coaxial.

5. The hinge assembly according to claim 1, wherein the display is a touch display and has a touch surface and the back surface opposite to each other.

6. An electronic device, comprising:
a first body, having a back surface;
an arm;
a hinge assembly, comprising:
a first hinge, pivoted between the first body and the arm so as to enable the first body to rotate relative to the arm; and
a second hinge, assembled to the first hinge and comprising at least one positioning surface leaning against the back surface of the first body.

7. The electronic device according to claim 6, wherein the arm has a first end and a second end opposite to each other, and the first hinge is connected between the first end and the back surface of the first body, the electronic device further comprising:
a second body; and
a third hinge, connected between the second end and the second body so as to enable the arm to rotate relative to the second body.

8. The electronic device according to claim 6, wherein the second hinge and the back surface of the first body have magnetic coupling capable of attracting each other, a cross-section of the second hinge is polygonal and has a plurality of positioning surfaces having different areas, any two adjacent positioning surfaces are not parallel to each other, and when the first body is rotated relative to the arm, the display is positioned on one of the positioning surfaces.

9. The electronic device according to claim 6, wherein the first hinge and the second hinge are coaxial.

10. The electronic device according to claim 6, wherein the first body is a touch display and has a touch surface and the back surface opposite to each other.

* * * * *